May 10, 1966 A. ARTAMA 3,250,211

APPARATUS FOR MAKING LAMINATED GLASS PANES

Filed Nov. 23, 1964 2 Sheets-Sheet 1

INVENTOR.
ARVI ARTAMA
BY Zabthein.
Agent

APPARATUS FOR MAKING LAMINATED GLASS PANES
Filed Nov. 23, 1964 2 Sheets-Sheet 2
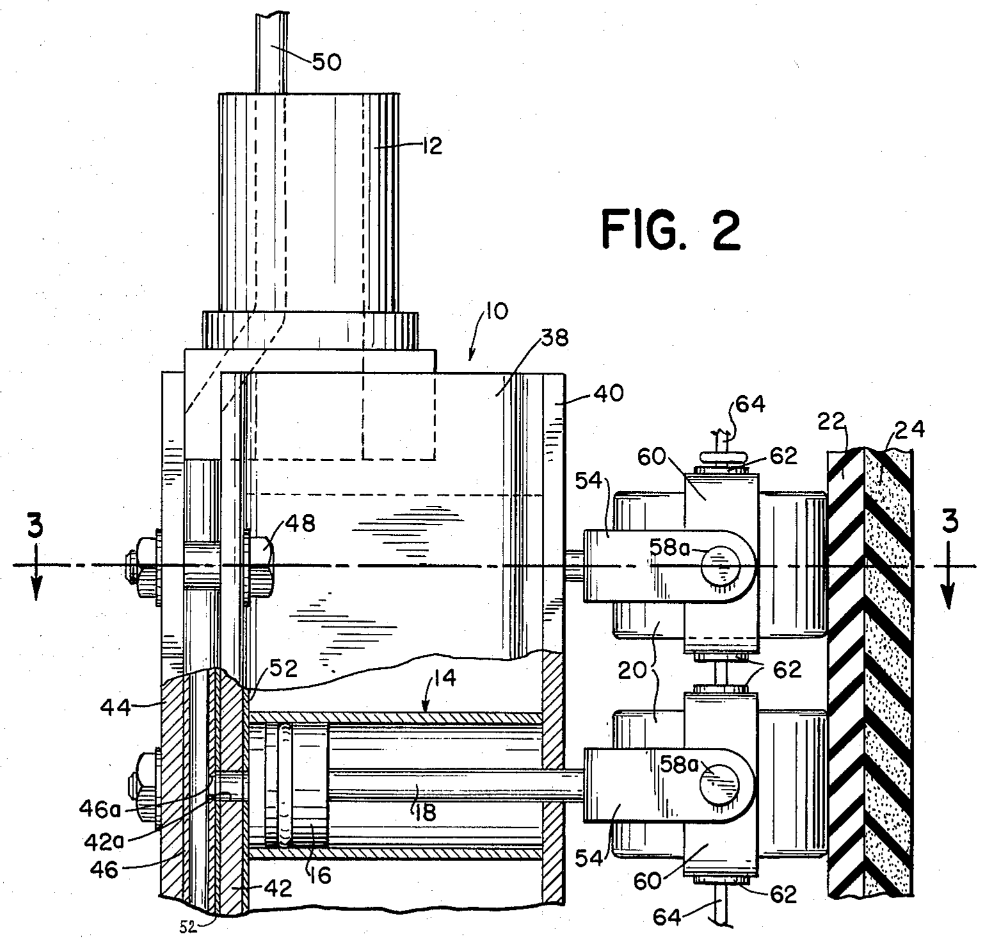
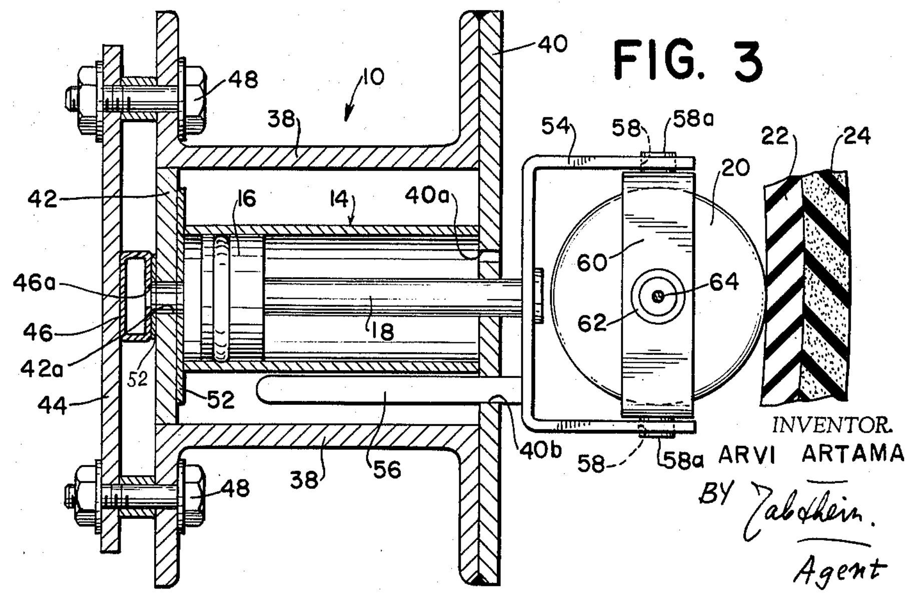
INVENTOR.
ARVI ARTAMA
BY Zabother.
Agent

United States Patent Office 3,250,211

Patented May 10, 1966

1

3,250,211

APPARATUS FOR MAKING LAMINATED GLASS PANES

Arvi Artama, Lemminkaisenkatu 8C, Tampere, Finland

Filed Nov. 23, 1964, Ser. No. 413,227
Claims priority, application Finland, Dec. 17, 1963, 2,489/63
8 Claims. (Cl. 100—170)

The present invention relates to an apparatus for making laminated glass panes, and more particularly for manufacturing unbreakable, shatter-proof windshields for vehicles and like purposes. Most of these glass panes are cemented together from individual glass sheets which, of course, may be bent so as to present curved surfaces.

In the manufacture of unbreakable, so-called safety windshields, most frequently a method is being used according to which two glass sheets are cemented together by means of a plastic film or similar substance, forming an intermediate layer between said sheets. Thus, a better resistance to impact is given to the windshield; in the event of breakage, glass splinters are being prevented from being scattered around and thereby causing damage, for example, to people riding in the vehicle in question.

When this safety glass, sometimes identified by its commerical name as "Triplex" glass, is manufactured, all the air must be completely removed from between the contacting surfaces of both glass and plastic-film layer so as to insure impeccable transparency and satisfactory mechanical strength.

In most of the devices used for making laminated glass panes, the two glass sheets and one intermediate plastic layer are compressed, and the air removed from between them, by means of resilient rolls or cylinders, for instance, a pair of rubber rolls. Upon this mechanical treatment, the laminated glass is subjected to appropriate heat treatment, e.g. in an autoclave.

When the glass sheets to be joined have a completely flat, or a fully cylindrical surface, the aforementioned laminating method does not present any difficulties. However, if non-cylindrical curvatures are present in one or more directions, as is the case with most automobile windshields, the usual rubber rolls or cylinders are not resilient enough. Thus, the glass sheets to be joined will develop untoward stresses during, or sometimes after, lamination so that the glass pane breaks. The high percentage of rejects caused by this kind of manufacture increases production costs considerably. Also, there is a substantial danger in not discovering hidden stresses until the panes or windshields are already mounted in a vehicle, increasing the waste in expenditure and the danger of application.

Efforts have been made to improve the manufacture of these laminated panes by providing in the appropriate apparatus a pair of rolls comprising several components, each of which is individually resilient. Even so, uniform laminating force could not be achieved throughout the curved glass surfaces and there always remained some factors which are the cause of the individual glass sheets, or the composite pane, eventually to break.

The object of the present invention is to provide an improved apparatus for making laminated glass panes, which obviates the hitherto experienced difficulties and drawbacks.

It is a further object of the invention to make such an apparatus, by which even curved laminated glass panes may be subjected to a fully uniform and controlled laminating pressure, without producing dangerous bending moments.

It is yet another object of the invention to provide a plurality of independent yet co-ordinated pressure means

2 within the glass laminating, preferably rubber, cylinders.

According to one of the important features of the present invention, a pair of laminating cylinders is provided in the apparatus, each cylinder having a tubular shape and being made from resilient material, a plurality of pressure cylinders being arranged inside each laminating cylinder, each pressure cylinder carrying a roller which bears against a portion of the inner laminating-cylinder wall.

The aforementioned pressure cylinders are preferably mounted along a support beam held in stationary manner inside each laminating cylinder; appropriate pins are provided at the journaling points of the laminating cylinders with respect to a supporting framework.

According to further features of the invention, the rollers of the pressure cylinders are carried by piston rods by the intermediary of fork-shaped members which hold the rollers proper by way of intermediate frames. Each pressure cylinder may be associated with a guide pin, rigid with the fork-shaped member, and guided in an appropriate bore of the supporting structure associated with each support beam, so as to prevent the roller of the pressure cylinder from turning.

According to yet another noteworthy feature of the invention, means are provided in association with the pressure-cylinder rollers, arranged in a row inside the laminating cylinders, for limiting the swinging motion of the aforementioned intermediate frames. These means may, for example, be in the form of a steel wire or like element threaded through the axes of the aligned rollers of the pressure cylinders.

Other objects, advantages and features of the invention will be appreciated and more fully understood with reference to the following detailed description, when considered with the accompanying drawings, wherein:

FIG. 2 is a partial, somewhat enlarged, view of two pressure cylinders forming part of the inventive apparatus, as seen from the front (like FIG. 1), with inner parts broken away; and FIG. 3 is a sectional view taken along line 3—3 of FIG. 2; in both of these latter views, a portion of the laminating-cylinder wall is also shown.

Figure 1:
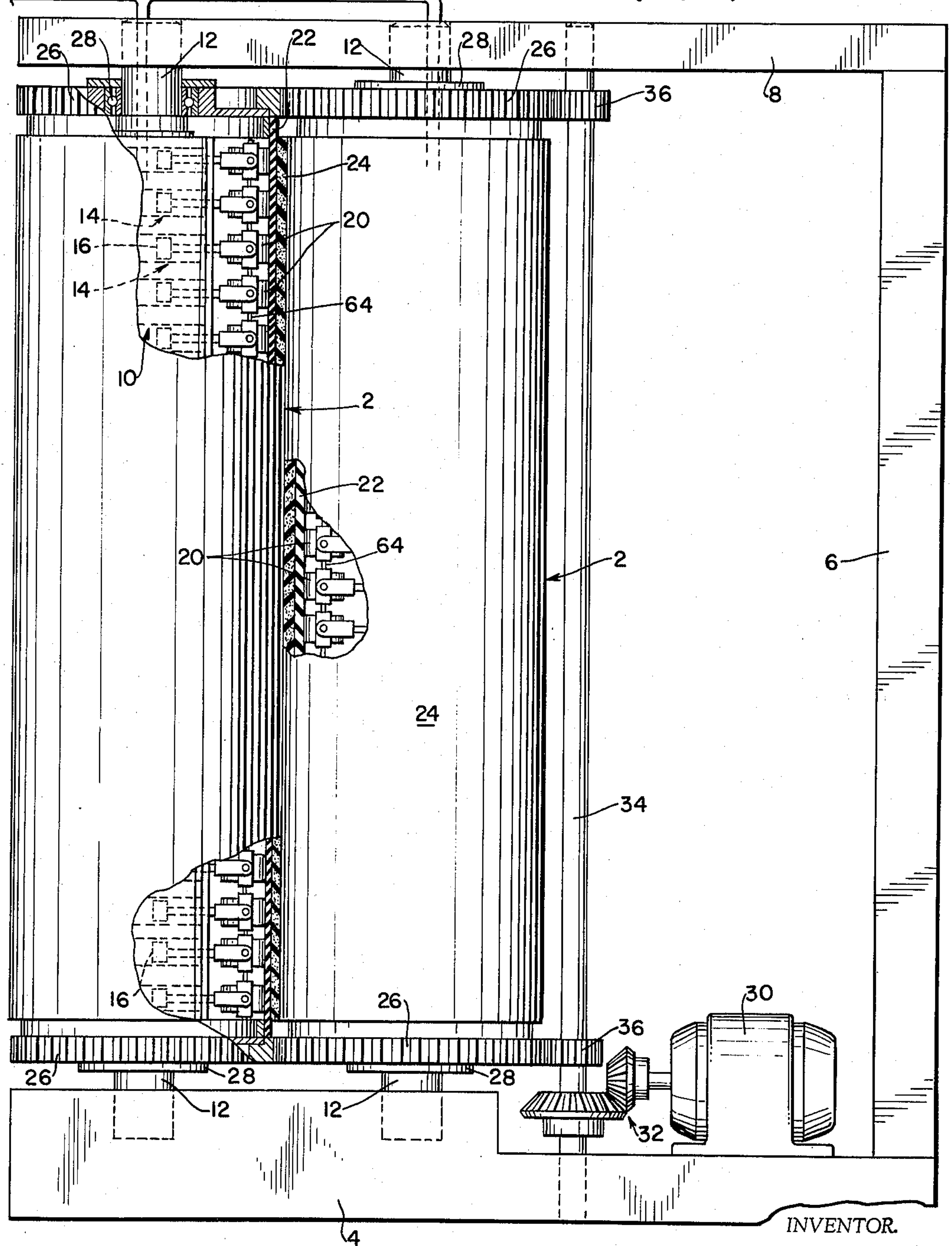
FIG. 1 illustrates an exemplary embodiment of the inventive apparatus for making laminated glass panes, in a partly sectional front view.

In the drawings, a preferred embodiment of the inventive apparatus is illustrated, FIG. 1 giving an overall front view, with parts broken away, while FIGS. 2 and 3 illustrate the inner mechanism on a somewhat enlarged scale. FIG. 1 shows the apparatus from the front; it is preferably located or arranged on the floor, with a pair of laminating cylinders 2 arranged in a vertical position, as shown. The apparatus includes a framework comprising a pedestal or base 4 at one end of which there is a vertical frame portion or support beam 6 while the top end of the latter is connected to a horizontal frame portion or beam 8, parallel with base 4.

At a suitable distance from each other, stationary support beams 10 are arranged within the cylinders 2 (only that of the left-hand cylinder being shown in FIG. 1). FIG. 2 illustrates the top portion of this beam 10 on an enlarged scale, FIG. 3 representing a horizontal sectional view thereof. The support beams 10 may be assembled by welding together appropriate steel sections the ends of which are provided with pins 12 for fastening the beams 10 to pedestal or base 4 and to upper beam 8.

As will be explained later, compressed air is led to the laminating cylinders 2 through a common duct 50 which is only schematically shown in the drawings.

On the inside of each beam 10, there is a number of pneumatic pressure cylinders generally designated 14 and arranged side-by-side in a row, substantially parallel to the axis of the laminating cylinders 2. Each cylinder 14 has therein a piston 16 rigid with a piston rod 18, the end of the latter carrying, in a rotatable manner, a pressing roller 20 by means of appropriate bearings, as will be described in full detail as the description proceeds. The axes of the rollers 20 are parallel to those of the cylinders 2.

It will be understood that both support beams 10 have identical pneumatic cylinders 14 and rollers 20 which, however, face each other, as shown in FIG. 1 in the respective broken-away portions of the two cylinders 2, so that the latter are pressed against one another from the inside with substantially equal force when the air pressure to the pressure cylinders 14 is turned on. The glass panes to be laminated (not shown) will be passed between the two cylinders 2.

The cylinders 2 are made with a resilient rubber envelope 22 and a—preferably somewhat shorter—topmost layer 24 made from sponge rubber. The purpose of the latter is to assist the cylinders 2 in adjusting themselves to the curved shape of the processed glass panes and to prevent the underlying rubber layer 22 from being damaged. Although no gap or space has been illustrated between the contacting outer layers 24 of the neighboring cylinders 2, it will be understood that the glass panes can be passed therebetween owing to the resilience of the aforementioned envelope and cover layers 22, 24. These can, of course, also be made from any other suitable resilient material, e.g. felt, plastic foam, or other substances.

The top and bottom ends of the cylinders 2 are provided with meshing gears 26; the rubber envelopes 22 are fastened to the collars of these gears, as shown in FIG. 1. The gears 26 are fitted to pins 12 by way of bearings 28, the latter elements being supported by the base and top frame portions 4, 8. As mentioned before, the support beams 10 and their terminal pins 12 are stationary while the bearings 28 can freely rotate therearound together with the cylinders 2 attached to them.

An electric motor 30 is provided for driving the apparatus; it is attached to the base 4 and has a bevel gearing 32 acting on a shaft 34 journaled between frame portions 4 and 8. Shaft 34 carries pinions 36 which turn the intermeshing gears 26 at the cylinder ends. Fully synchronous rotation of the cylinders 2, in opposite directions, is insured hereby.

FIGS. 2 and 3 more clearly show the inner construction of the support beam 10 pertaining to the left-hand cylinder 2 of FIG. 1. The inner supporting structure comprises beams 38 made of appropriate steel sections which are joined by a plate 40 so as to leave sufficient space for the pressure cylinders 14. The latter are secured between the aforementioned plate 40 and respective end plates 42. Behind the latter there is another plate 44, and between these plates a pneumatic conduit 46 fed from the aforementioned duct 50. The cylinders 14, the plates 42 and the conduits 46 are tightened by means of bolts 48 holding together said plates 44 and a substantially parallel portion (not shown) of steel-section beams 38, as illustrated. Appropriate spacers and washers may be interposed in a conventional manner.

The pneumatic conduit 46 is made of relatively strong-walled metal tube having appropriate orifices **46*a* for each pressure cylinder 14, plate 42 having, likewise, corresponding orifices 42*a*** for passing compressed air therethrough.

Between the head of each cylinder 14 and plate 42, as well as between the conduit 46 and plate 42, suitable packings 52 are provided for preventing air leakage. The forward ends of cylinders 14, closer to rollers 20, require no packing as the cylinders are of the single-action type. Bores **40*a* are provided in plates 40 for each cylinder so as to allow air to escape from the low-pressure side of piston 16**.

To the end of each piston rod 18 is attached a fork-shaped member 54 for carrying the appropriate pressing roller 20. Fastened to this member 54 is also a guide pin 56, parallel with piston rod 18, for holding member 54 in a plane perpendicular to the longitudinal direction of support beam 10. Pin 56 passes through bore **40*b* of plate 40 (this part of the structure being omitted from FIG. 2 for the sake of clarity). The outer ends of fork member 54 are provided, by the intermediary of bearings 58, and a pin or bolt 58*a* passing therethrough, with a swingingly mounted intermediate frame 60. The latter carries the roller 20 which is attached by way of bearings 62. By this arrangement, it is possible to make the rollers 20 adjust themselves along the inner wall surface of the envelope 22 of each laminating cylinder 2**.

It should be noted that rollers 20 have hollow shafts. An elastic steel wire 64 or like element may be threaded through these roller shafts so as to keep them substantially parallel without interfering with their turning movement, if this should prove necessary.

When using the inventive apparatus for laminating glass panes, compressed air is introduced into duct 50 and thence into conduit 46, from where all the cylinders 14 are fed inside the adjoining laminating cylinders 2. When the motor 30 is started, the cylinders 2 rotate in opposite directions while the pressing rollers, urged by the cylinders 14 toward the inner envelope walls 22, and toward the other laminating cylinder, press the two cylinders against one another. The outer envelopes, however, yield rather easily when, for instance, the surface of the glass is somewhat curved. The laminating cylinders 2 thus adjust themselves to the prevailing surface curvatures, or irregularities, of the processed glass pane The pressure with which the rollers 20 act may be controlled by regulating the air pressure in duct 50, or optionally in either or both of the conduits 46 of the cylinders 2 forming a pair. Conventional means may be provided herefor which have not been illustrated.

The foregoing disclosure relates only to a preferred embodiment of the invention which is intended to include all changes and modifications of the example described within the scope of the invention as set forth in the appended claims.

What I claim is:

1. An apparatus for making laminated glass panes, comprising, in combination, a pair of adjoining laminating cylinders having an envelope consisting of at least one layer of resilient material, frame means for supporting said laminating cylinders at a predetermined distance from one another, means for synchronously rotating said laminating cylinders in opposite directions, stationary support means inside each of said laminating cylinders, a plurality of pressure cylinder means attached to said support means, a reciprocable roller associated with each pressure cylinder means in close contact with the inner wall of said envelope of each of said laminating cylinders, and means for urging the rollers of each laminating cylinder toward the rollers of the other laminating cylinder, wherein each pressure cylinder means has a reciprocable piston, a piston rod connected thereto, a fork-shaped member at the outer end of said piston rod, an intermediate frame pivotally attached to said fork-shaped member, said rollers being rotatably secured to said intermediate frame, whereby the axes of said rollers can adjust themselves to variations in said inner wall against which they are urged.

2. An apparatus according to claim 1, wherein each pressure cylinder means further has guide means substantially parallel with said piston rod for preventing the latter from turning.

3. An apparatus according to claim 2, wherein said guide means includes a pin rigid with said fork-shaped member and reciprocable through a bore in a portion of said support means.

4. An apparatus according to claim 2, further comprising means operatively connected to at least some of said pressure cylinder means for limiting the swinging motion of the respective intermediate frames and the rollers secured thereto.

5. An apparatus according to claim 4, wherein said limiting means includes an elongated element passing through the hollow shafts of the respective ones of said rollers.

6. An apparatus according to claim 4, wherein said support means comprise at least two interconnected steel sections joined by a plate member so as to provide space therebetween for said pressure cylinder means, a backing plate and bolt means between the latter and portions of said steel sections.

7. An apparatus according to claim 6, further comprising conduit means interposed between said pressure cylinder means and said backing plate, said conduit means being adapted to be fed by compressed air from extraneous pneumatic means and having orifices leading to said pressure cylinder means.

8. An apparatus according to claim 7, wherein each pressure cylinder means defines a cylinder space for each piston, further comprising an end wall between said cylinder space and said conduit means, and packing means on at least one side of said end wall.

References Cited by the Examiner

UNITED STATES PATENTS

| | | | |
|---|---|---|---|
| 530,421 | 12/1894 | Judd. | |
| 2,395,915 | 3/1946 | Specht | 29—116 X |
| 2,893,905 | 7/1959 | Makovic et al. | 100—172 X |
| 2,908,964 | 10/1959 | Appenzeller | 29—110 |
| 2,950,507 | 8/1960 | Keyser | 29—116 X |
| 2,983,635 | 5/1961 | Richardson | 100—170 X |
| 2,997,406 | 8/1961 | Freeman et al. | 29—130 X |
| 3,119,324 | 1/1964 | Justus | 29—116 X |

WILLIAM I. PRICE, *Primary Examiner.*

LOUIS O. MAASSEL, *Examiner.*